(12) United States Patent
Gillant et al.

(10) Patent No.: US 12,544,512 B2
(45) Date of Patent: Feb. 10, 2026

(54) NEEDLELESS INJECTION DEVICE

(71) Applicant: L'OREAL, Paris (FR)

(72) Inventors: Flavie Gillant, Chevilly LaRue (FR);
Lien Planard-Luong, Chevilly LaRue (FR)

(73) Assignee: L'OREAL, Paris (FR)

( * ) Notice: Subject to any disclaimer, the term of this patent is extended or adjusted under 35 U.S.C. 154(b) by 807 days.

(21) Appl. No.: 17/425,513

(22) PCT Filed: Feb. 6, 2020

(86) PCT No.: PCT/EP2020/053053
§ 371 (c)(1),
(2) Date: Jul. 23, 2021

(87) PCT Pub. No.: WO2020/161271
PCT Pub. Date: Aug. 13, 2020

(65) Prior Publication Data
US 2022/0080126 A1    Mar. 17, 2022

(30) Foreign Application Priority Data

Feb. 7, 2019 (FR) ...................................... 1901214

(51) Int. Cl.
*A61M 5/30* (2006.01)
*A61M 5/20* (2006.01)

(52) U.S. Cl.
CPC ................ *A61M 5/30* (2013.01); *A61M 5/20* (2013.01); *A61M 2205/0272* (2013.01)

(58) Field of Classification Search
CPC ... A61M 5/30; A61M 5/20; A61M 2205/0272
See application file for complete search history.

(56) References Cited

U.S. PATENT DOCUMENTS

| 2003/0083611 A1* | 5/2003 | Angel | A61M 5/30 |
| | | | 604/68 |
| 2007/0191758 A1* | 8/2007 | Hunter | A61B 17/20 |
| | | | 604/164.01 |

(Continued)

FOREIGN PATENT DOCUMENTS

| CN | 102247637 A | 11/2011 |
| DE | 102017114930 A1 | 1/2019 |

(Continued)

OTHER PUBLICATIONS

International Search Report (ISR) for PCT/EP2020/053053 mailed Apr. 8, 2020 (4 pages).

(Continued)

*Primary Examiner* — Lauren P Farrar
(74) *Attorney, Agent, or Firm* — Jason A. Smith; Shumaker, Loop & Kendrick, LLP

(57) ABSTRACT

A needleless injection device including a piston moved by at least one electromagnetic actuator fed with electric current, the actuator including a stationary structure magnetically interacting with a mobile element in order to exert a force thereon during the injection, one at least from the mobile element and from the stationary structure having, by design, magnetic properties which vary in the direction of movement of the mobile element such as to generate a predefined intensity force on the mobile element during the movement thereof relative to the stationary structure.

16 Claims, 3 Drawing Sheets

(56) References Cited

U.S. PATENT DOCUMENTS

| | | | |
|---|---|---|---|
| 2010/0016827 A1* | 1/2010 | Hunter | A61M 5/30 604/67 |
| 2012/0095435 A1* | 4/2012 | Hunter | A61M 5/3015 604/500 |
| 2017/0143906 A1* | 5/2017 | Coats | A61M 5/2033 |

FOREIGN PATENT DOCUMENTS

| | | |
|---|---|---|
| GB | 686343 A | 1/1953 |
| WO | 2006/086774 A2 | 8/2006 |

OTHER PUBLICATIONS

Written Opinion for PCT/EP2020/053053 mailed Apr. 8, 2020 (7 pages).

* cited by examiner

[Fig 1]
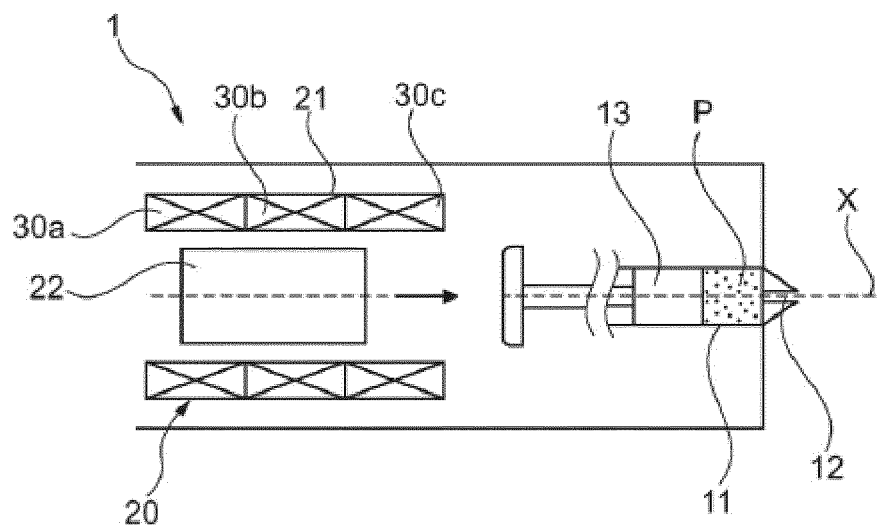
[Fig 2]
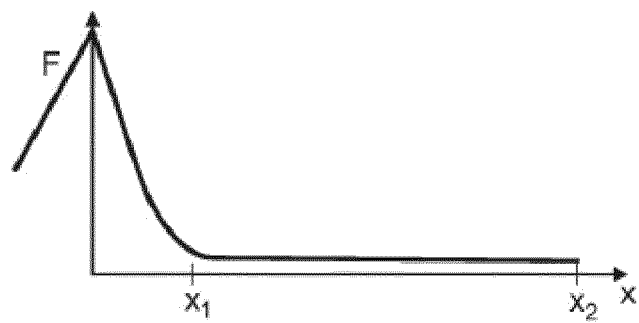

[Fig 3]
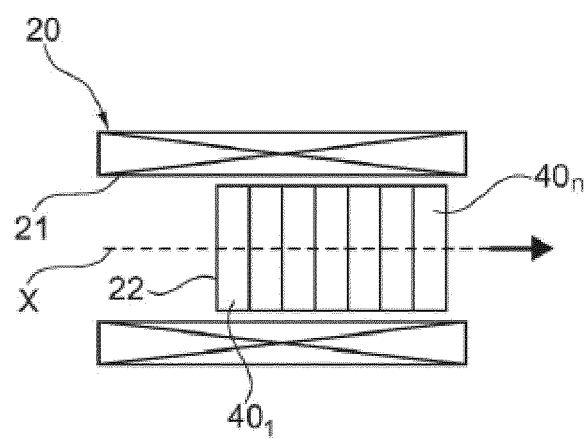
[Fig 4]
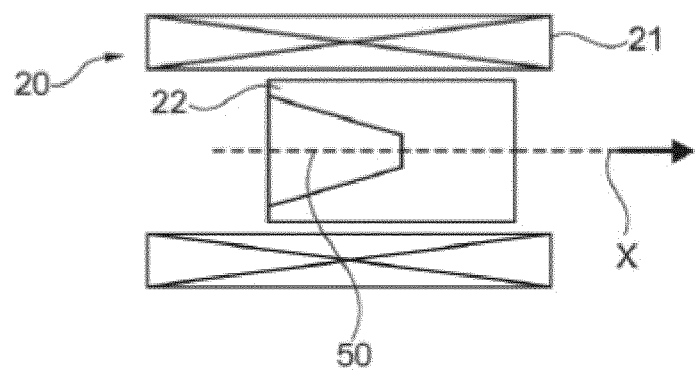

[Fig 5]
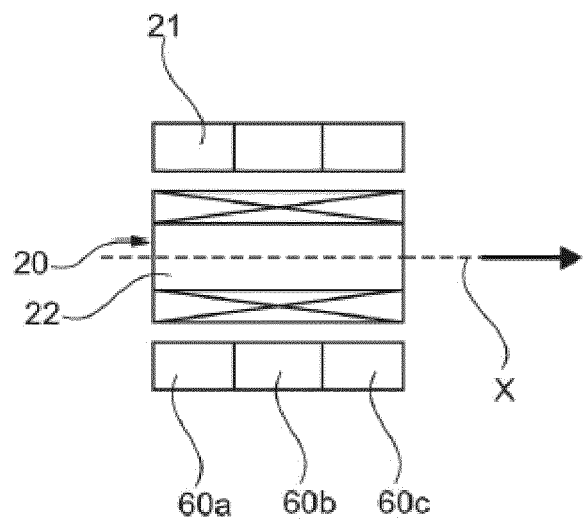
[Fig 6]
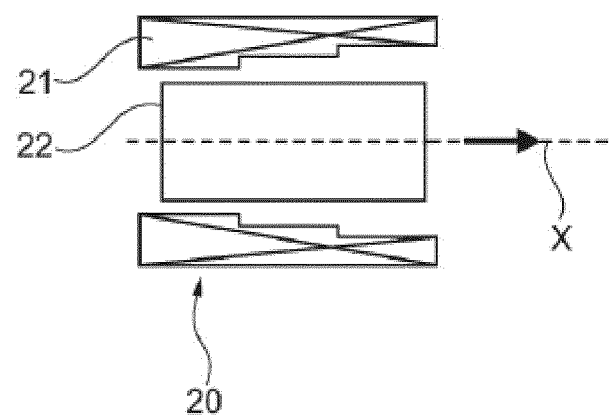

NEEDLELESS INJECTION DEVICE

TECHNICAL FIELD

The present invention relates to injection devices used to inject a substance into the human or animal body, and more particularly needleless injection devices.

BACKGROUND

Prior Art

Needleless injection devices function by creating, by means of a piston moving in a reservoir, a jet of fluid or of powder under extremely high pressure which penetrates the skin. The profile of the force exerted by the piston can be broken down into a first short-duration stage where the intensity of the force must be high such that the jet reaches a speed which allows it to pierce the skin and a second longer stage of less intensity which injects the desired amount to the intended depth. When the product is a filling agent, the amount of product injected is typically from 20 to 100 microlitres and the injection depth is the junction between the dermis and the epidermis.

It has been proposed to generate the pressure by means of a piston driven by a spring, a compressed gas, a pyrotechnic element or a piezoelectric actuator.

One disadvantage of these known devices is the difficulty of mastering the progression of the pressure over time, and therefore the injection parameters.

Electromagnetic injection devices have thus been developed which make it possible to more precisely control the pressure exerted on the piston over time.

An example of such a device is described in the application US 2007/0191758. The electromagnetic actuator includes a mobile element including a coil and a stationary structure having permanent magnetization, with which the mobile element interacts. The coil is actively fed by a microprocessor control circuit.

The application US 2017/0143906 discloses an injector in which the movement of the mobile element results from the force exerted by a spring on the one hand and by an electromagnetic actuator on the other.

SUMMARY

The aim of the invention is to improve the needleless injection devices such as to notably obtain the sought profile of force without a complex control circuit or to enhance the injection precision.

The aim of the invention is to meet this objective and the subject matter thereof, according to a first aspect thereof, is a needleless injection device including a piston moved by at least one electromagnetic actuator fed with electric current, the actuator including a stationary structure magnetically interacting with a mobile element in order to exert a force thereon during the injection, one at least from the mobile element and from the stationary structure having, by design, magnetic properties which vary in the direction of movement of the mobile element such as to generate a predefined intensity force on the mobile element during the movement thereof relative to the stationary structure.

"Having, by design," means that the actuator is produced to generate the sought profile of force independently of active control of the intensity of the electric current fed thereto.

Thus, the invention makes it possible to avoid the use of a complex and costly microcontroller control circuit. Feeding electricity to the actuator can remain relatively simple, for example be chosen from several levels of intensity or voltage, without requiring active control as a function of the position of the mobile element.

Nevertheless, when such a control circuit is present, the invention has the advantage of allowing an even more precise control of the force profile, by making it possible, for example, to provide some of the sought force variation through the design of the actuator. The range of the force variation linked to active control can be reduced as a result, making the control circuit easier to produce, notably with less powerful and less expensive components.

Preferably, the mobile element moves along an axis. A straight movement of the mobile element is preferred, but the invention can furthermore use a different movement of the mobile device, notably by rotation.

One at least from the mobile element and from the stationary structure is preferably coiled and/or fed with electricity in a non-homogeneous manner, notably in the direction of movement of the mobile element.

For example, one at least from the stationary structure and from the mobile element includes at least a first winding and a second winding placed as an extension of the first, the first and second winding differing by one at least from the number of turns per unit of length and from the intensity of the current passing therethrough.

For example, the two windings are produced from conductive wires having different diameters. Thus, the winding produced with the wire having a greater diameter can be fed with a current of stronger intensity, and therefore produce a more intense magnetic field.

The two windings can be fed with electricity in series or in parallel.

It is possible to have more than two windings, for example three windings, with a number of turns per unit of length increasing from one winding to the other or a wire section increasing from one winding to the other. These windings can be fed with electricity in parallel. For example, there is a variation in the number of turns per unit of length of at least 10%, preferably of more than 20%, more preferably more than 30%, or 50% or more, in the direction of movement of the mobile element, starting from the largest number of turns per unit of length, for example. It is furthermore possible to have a section of the wire varying by at least 10%, preferably by more than 20%, more preferably more than 30%, or 50% or more, in the direction of movement of the mobile element, starting from the largest section, for example.

In an alternative, one at least from the mobile element and from the stationary structure includes at least two windings selectively fed during the forward motion of the mobile element. This can allow a variable intensity force to be created during the forward motion of the mobile element.

One at least from the mobile element and from the stationary structure can have a permanent magnetization varying in the forward motion direction of the mobile element. For example, one at least from the mobile element and from the stationary structure includes a succession of permanent magnets with a magnetization varying in the direction of movement of the mobile element.

For example, magnets having a varying magnetic flux density are used. For example, it is possible to use magnets produced from different materials, having different magnetic flux densities. For example, the magnetic flux density varies from more than 12000 gauss to less than 10000 gauss from one end to the other of the stationary structure or of the mobile element which includes these magnets. For example, there is a variation in the magnetic flux density of more than 10%, preferably of more than 20%, more preferably more than 30%, or 50% or more, in the direction of movement of the mobile element due to the use of different permanent magnets, starting from the highest density, for example. It is furthermore possible to insert, between the magnets, magnetic materials that are saturated to a greater or lesser degree, in order to vary the magnetic properties in the direction of movement.

One at least from the mobile element and from the stationary structure can include a magnetic core with a cross section varying in the direction of movement of the mobile element. For example, there is a section varying by at least 10%, preferably by more than 20%, more preferably more than 30%, or 50% or more, in the direction of movement of the mobile element, starting from the largest section, for example. This section variation is, for example, obtained thanks to the presence of a recess within the mobile element.

The air gap between the stationary structure and the mobile element can vary in the direction of movement of the mobile element. For example, there is an air gap varying by at least 10%, preferably by more than 20%, more preferably more than 30%, or 50% or more, in the direction of movement of the mobile element, starting from the location where the air gap is greatest, for example.

It is also possible to produce the mobile element or the stationary structure with local constrictions of the section provided for the passage of the magnetic flux, such as to obtain a saturation by the magnetic flux and a reduction in the force of magnetic interaction between the mobile element and the stationary structure from a certain movement of the mobile element relative to the stationary structure.

The mobile element can be arranged to strike the piston with a non-zero speed. This makes it possible to accumulate a kinetic energy which is transmitted at least partially to the piston during the impact, and thus a pressure of high intensity, that can be used to pierce the skin. Preferably, the force exerted by the stationary structure on the mobile element in order to propel it is at a maximum at the moment of impact.

Preferably, the electromagnetic actuator is arranged to exert a sufficiently long force after the impact of the mobile element against the piston in order to prevent and/or limit the rebound of the mobile element on the piston. The invention also makes it possible to more easily generate the suitable force profile while having a force with a sufficient intensity to pierce the skin.

Preferably, the moving of the mobile element for the injection takes place only as a result of feeding electricity to the electromagnetic actuator. However, there is no departure from the scope of the present invention when the movement of the mobile element is assisted by an additional mechanical means like a spring or a compressed gas for example.

Preferably, only the stationary structure is fed with electricity. In this case, the mobile element is, for example, produced with one or more permanent magnets. This can increase the mechanical reliability of the injection device. This can also increase the inertia of the mobile element and the quantity of energy accumulated in kinetic form before impact with the piston. In an alternative, the mobile element is fed with electricity, or both the stationary structure and the mobile element are fed with electricity.

As indicated above, the actuator is advantageously fed with electricity without controlling the intensity as a function of the position of the mobile element during the movement thereof. If required, it is possible to provide several levels of supply voltage, depending for example on the nature of the product to be injected and/or on the quantity to be injected. From an electronic perspective, this makes it possible to simplify the injection device. However, there is no departure from the scope of the invention when the actuator is electrically commanded in a more complex manner, with control of the feed intensity as a function of the movement, if required. In this case, the control takes into account the change in the exerted force which results from the variation of the magnetic properties obtained by design.

Another subject matter of the invention is a method of injecting into human keratin fibres, wherein a composition is injected into said fibres using an injection device according to the invention, as defined above.

BRIEF DESCRIPTION OF THE DRAWINGS

FIG. 1 schematically and partially represents an injection device according to an example of implementing the invention, FIG. 2 illustrates the progression of the force exerted on the mobile element during the movement thereof, FIG. 3 illustrates an alternative embodiment of the actuator, FIG. 4 is a view similar to FIG. 3 of an alternative embodiment of the actuator, FIG. 5 is a view similar to FIG. 3 of an alternative embodiment of the actuator, and FIG. 6 is a view similar to FIG. 3 of an alternative embodiment of the actuator.

DETAILED DESCRIPTION

FIG. 1 illustrates an injection device 1 according to the invention, including a reservoir 11 containing a product P to be injected, an injection nozzle 12, a piston 13 and an electromagnetic actuator 20 for acting upon the piston 13. The product P is, for example, for cosmetic purposes, based on hyaluronic acid or collagen, but can also be for medical purposes, for example a vaccine. The reservoir 11 is, for example, a pre-filled capsule, provided with the piston 13 and disposable. The diameter of the nozzle ranges for example from 50 to 300 microns.

The actuator includes a stationary structure 21 and a mobile element 22, which can move along an axis X, which is coincident in the example in question with the direction in which the jet of product P is issued during the injection.

The mobile element 22 moves, from an initial position, over a certain distance before striking the piston 13. It then accompanies the movement of the piston 13 in order to deliver the desired quantity of product.

FIG. 2 represents the force exerted on the mobile element 22. The force exerted at the negative abscissae corresponds to the acceleration of the mobile element preceding the impact. Preferably, the force is at a maximum at the moment of impact, as illustrated. It then decreases quite rapidly until an abscissa x1, then remains substantially constant until an abscissa x2.

The actuator is produced such that the force exerted on the mobile element only drops to zero after a relatively large movement thereof, while having a quite rapid decrease in the force after impact. This makes it possible to prevent a high-intensity force from being exerted over an excessively long period after impact, which could be detrimental for proper control of the injection, notably of the injection depth.

To obtain this progression profile for the force as a function of x, it is possible to produce one at least from the stationary structure and from the mobile element with inhomogeneous magnetic properties along the axis X.

For example, as illustrated in FIG. 1, the stationary structure 21 can be coiled in a non-homogeneous manner as a function of x.

For example, the stationary structure can include at least two windings one after the other along the axis X, for example three windings 30a, 30b and 30c. These windings produce different respective magnetic fields, and the resulting Lorentz force on the mobile element thus progresses as a function of x in a corresponding manner.

These windings 30a to 30c differ, for example, through the number of turns per unit of length. For example, there is a larger number of turns for the winding 30a and a smaller number for the winding 30c, such that the force exerted on the mobile element 22 decreases when the element moves in the direction of the piston 13.

It is also possible to produce the stationary structure with at least two windings which are produced from wires of different sections, but, for example, with the same number of turns per unit of length. The fact of feeding electricity to the windings in parallel and of using different sections of wires to produce them, causes a higher current in the winding formed from the wire having a larger section, and therefore a greater magnetic field. For example, it is possible to feed the windings 30a, 30b and 30c in parallel and produce them from wires of decreasing respective diameters, with a same number of turns per unit of length.

It is also possible to manipulate the inhomogeneous nature of the magnetic properties of the mobile element 22 in order to obtain a similar result, or manipulate both the inhomogeneous nature of the magnetic properties of the mobile element and of the stationary structure.

By way of example, FIG. 3 schematically and partially represents an alternative actuator 20 in which the mobile element 22 is produced from a succession of permanent magnets $40_1, \ldots 40_n$ (with n>1), that are chosen to have a magnetic flux density which varies along the axis X.

For example, the magnet $40_n$ closest to the piston 13 has a stronger magnetic flux density than the magnet $40_1$ which is furthest therefrom, through the choice of the materials for these magnets for example.

In conjunction with a mobile element having inhomogeneous magnetic properties, the stationary structure can have homogeneous properties along the axis X, or alternatively inhomogeneous properties, the stationary structure 21 being, for example, as described with reference to FIG. 1.

It is also possible to obtain inhomogeneous magnetic properties by producing the mobile element 22 with a core of magnetic material, for example soft iron or a ferrite, with a variable section along the axis X. For example, the mobile element 22 is produced with a recess 50 opening onto the mobile element 22 end furthest from the piston 13, this recess having a section which decreases in the direction of the piston 13.

It is also possible, notably when the mobile element 22 is coiled, as illustrated in FIG. 5, to produce the stationary structure 21 with magnetic properties that vary along the axis X, for example by stacking, along the axis X, permanent magnets 60a, 60b, and 60c having different respective magnetic flux densities.

Another possibility, which can be added to the others, is to manipulate the width of air gap between the mobile element 22 and the stationary structure 21 as a function of the abscissa x, as illustrated in FIG. 6. To obtain this air gap variation, it is possible, for example, to provide an inner section of the stationary structure 21 which varies along the axis X. Alternatively or additionally, it is the outer section of the mobile element 22 which varies along the axis X.

In the example of FIG. 6, the inner section of the stationary structure 21 decreases with distance to the piston 13, such that the air gap increases when the mobile element 21 moves towards the piston.

In an alternative, the mobile element 22 is provided with electrical contacts which selectively feed windings when the mobile element moves along the axis X. For example, the mobile element 22 is supplied with electrical contacts having rubbing elements which feed all of the coils of the stationary structure 21 at the start of the movement stroke of the mobile element 22, then some only thereof after a certain movement in the direction of the piston 13, which leads to a reduction in the Lorentz force exerted by the stationary structure 21 on the mobile element 22. However, it is preferred to produce the stationary structure and the mobile element without such rubbing element electrical contacts due to the latter wearing down.

The injection device can include a return spring for the piston and/or for the mobile element, which is not represented.

In the non-illustrated examples, the piston is not rigidly connected to the mobile element, since the mobile element is arranged to strike the piston. In non-illustrated alternatives, the piston is rigidly connected to the mobile element.

The invention claimed is:

1. A needleless injection device comprising a piston moved by at least one electromagnetic actuator fed with electric current, the actuator including a stationary structure magnetically interacting with a mobile element in order to exert a force thereon during the injection, one at least from the mobile element and from the stationary structure having, by design, magnetic properties which are inhomogeneous in the direction of movement of the mobile element such that the force exerted on the mobile element at a negative abscissae corresponds to acceleration of the mobile element preceding impact, the force being at a maximum at the moment of impact, then decreasing until an abscissa x1, and then remaining substantially constant until an abscissa x2, in order to deliver a desired quantity of product.

2. The device according to claim 1, wherein the mobile element moves along an axis.

3. The device according to claim 1, wherein the mobile element or the stationary structure being coiled and/or fed with electricity in a non-homogeneous manner in the direction of movement of the mobile element.

4. The device according to claim 3, wherein the stationary structure or the mobile element including at least a first winding and a second winding placed as an extension of the first, the first and second winding differing by one at least from the number of turns per unit of length and from the intensity of the current passing therethrough.

5. The device according to claim 4, wherein the two windings being produced from conductive wires having different diameters.

6. The device according to claim 4, wherein the two windings being fed with electricity in series or in parallel.

7. The device according to claim 3, wherein the mobile element or the stationary structure including at least two windings selectively fed during the forward motion of the mobile element.

8. The device according to claim 1, wherein the mobile element or the stationary structure having a permanent magnetization varying in the forward motion direction of the mobile element.

9. The device according to claim 8, wherein the mobile element or the stationary structure including a succession of permanent magnets with a magnetization varying in the direction of movement of the mobile element, notably having varying magnetic flux densities.

10. The device according to claim 1, wherein the mobile element or the stationary structure including a magnetic core with a cross section varying in the direction of movement of the mobile element.

11. The device according to claim 1, wherein the air gap between the stationary structure and the mobile element varying in the direction of movement of the mobile element.

12. The device according to claim 1, wherein the mobile element is arranged to strike the piston with a non-zero speed.

13. The device according to claim 12, wherein the electromagnetic actuator being arranged to exert a sufficiently long force after the impact of the mobile element and of the piston in order to prevent and/or limit the rebound of the mobile element on the piston.

14. The device according to claim 1, wherein the moving of the mobile element for the injection taking place only as a result of feeding electricity to the electromagnetic actuator.

15. The device according to claim 1, wherein only the stationary structure is fed with electricity.

16. The device according to claim 1, wherein the actuator being fed without controlling the intensity as a function of the position of the mobile element during the movement thereof.

* * * * *